Jan. 28, 1936.　　　　F. K. LOW　　　　2,029,030
TESTING SYSTEM
Filed Aug. 25, 1934　　　7 Sheets-Sheet 1
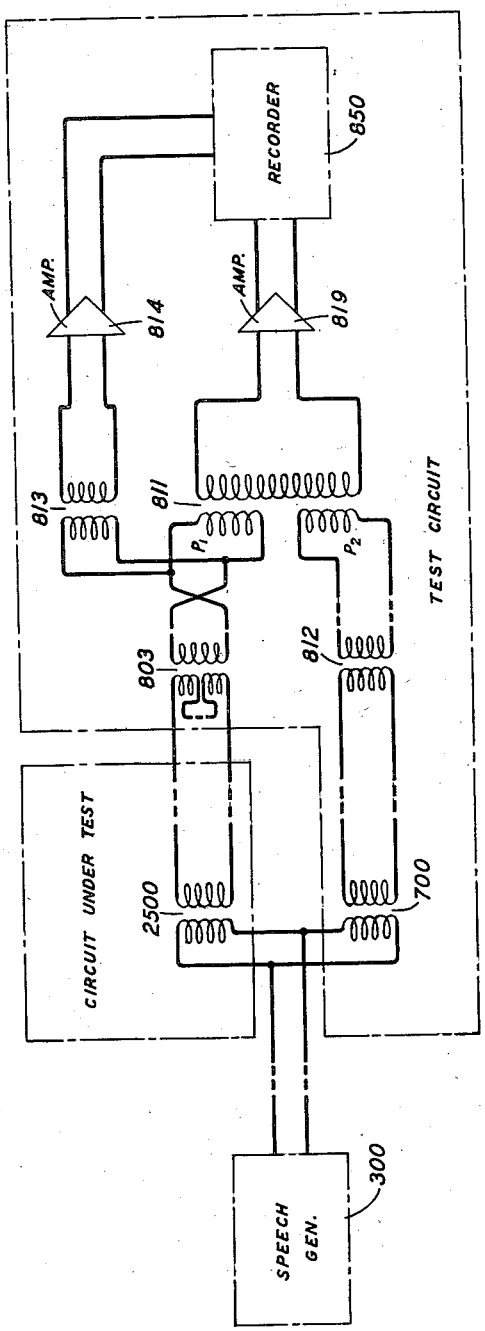
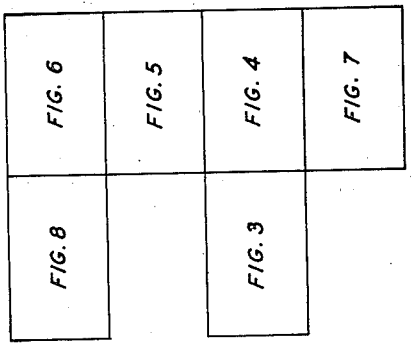
INVENTOR
F. K. LOW
BY P. C. Smith
ATTORNEY

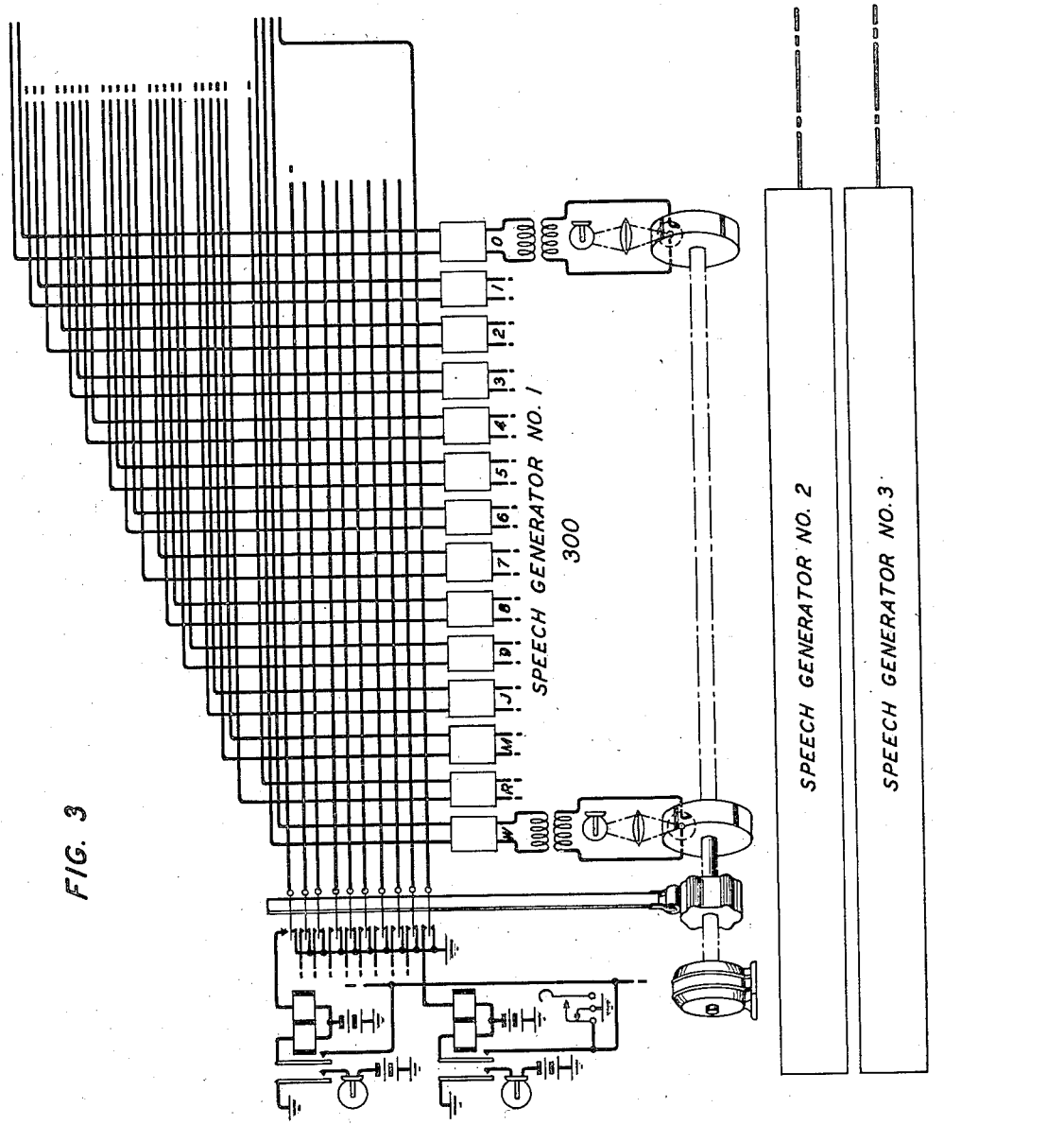

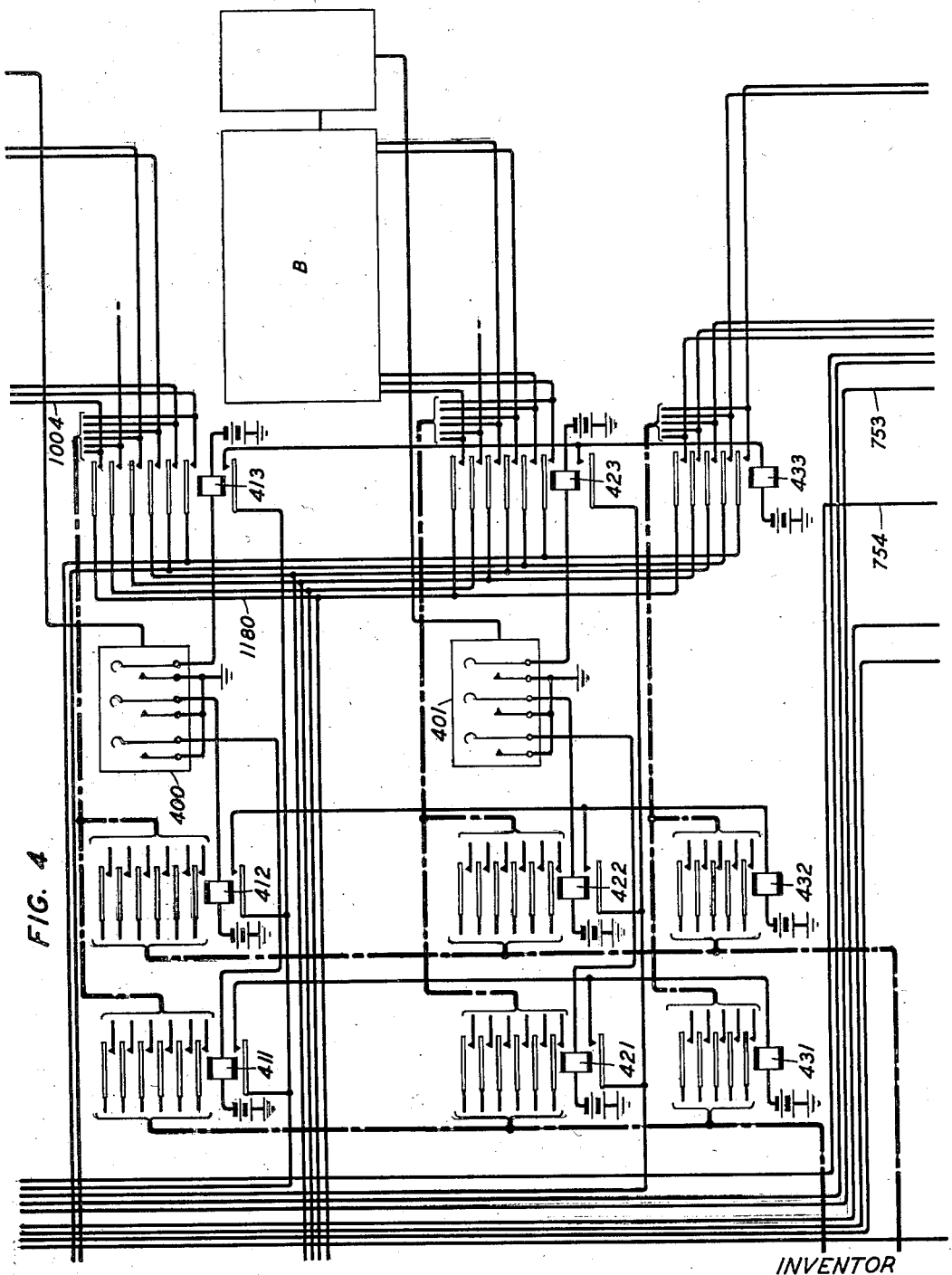

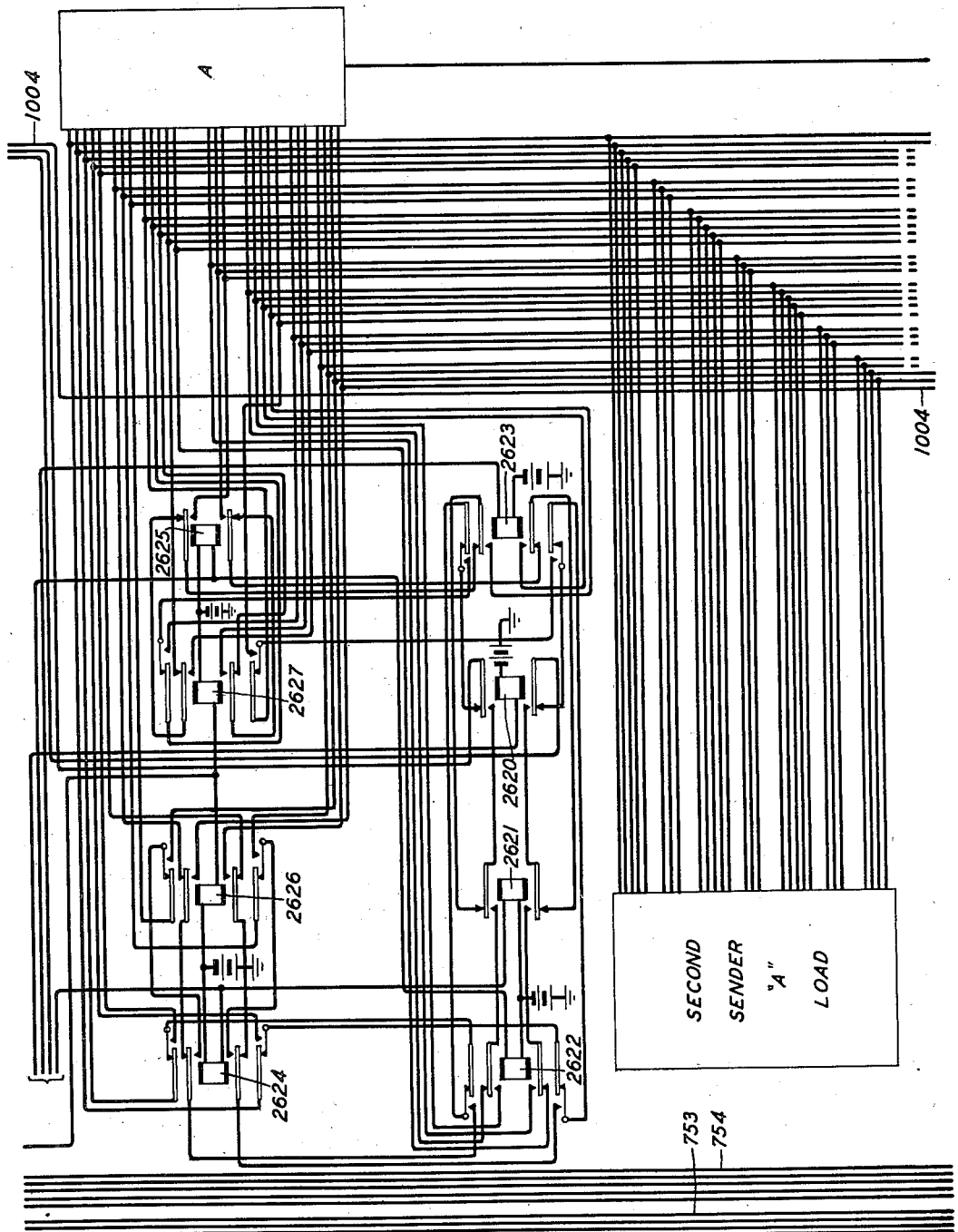

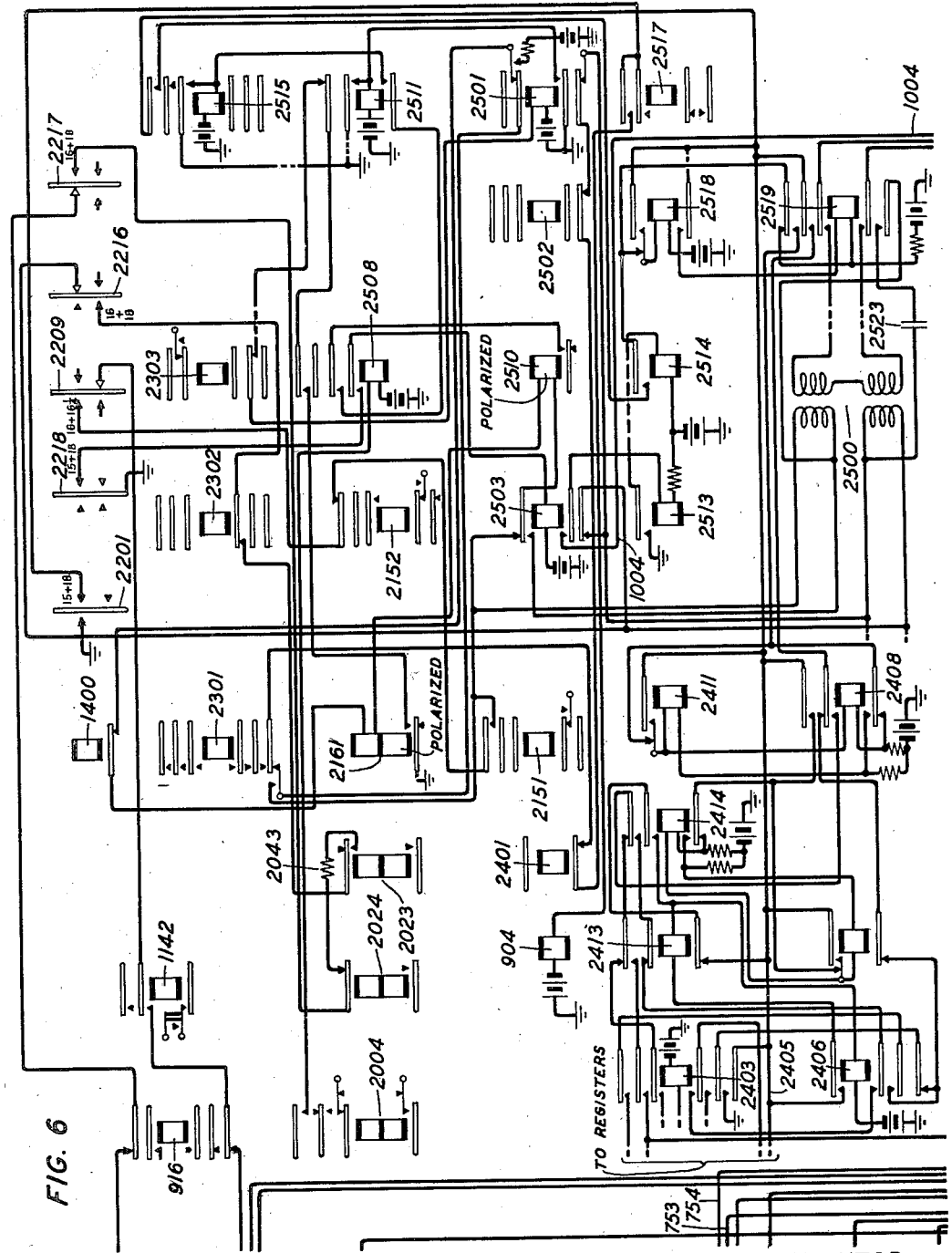

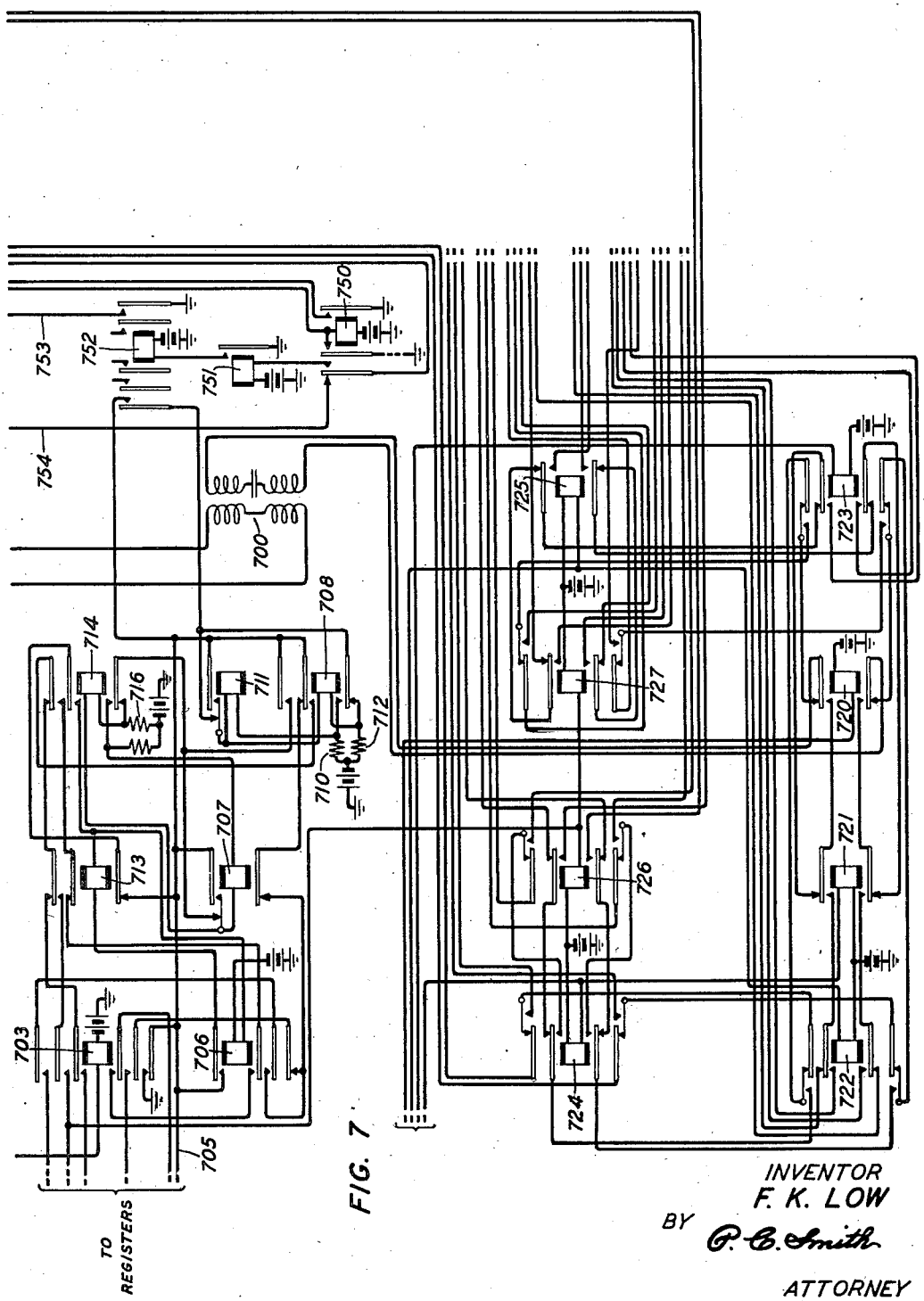

INVENTOR
F. K. LOW
BY
P. C. Smith
ATTORNEY

Patented Jan. 28, 1936

2,029,030

UNITED STATES PATENT OFFICE 2,029,030

TESTING SYSTEM

Frank K. Low, Brooklyn, N. Y., assignor to Bell Telephone Laboratories, Incorporated, New York, N. Y., a corporation of New York Application August 25, 1934, Serial No. 741,363

15 Claims. (Cl. 179—175.2)

This invention relates to telephone systems and has for its object to facilitate the testing of certain phases of telephone operation.

Among the more recent developments in telephone operation is the use of automatically generated speech currents for transmitting telephone designations from dial offices to manual offices. A separate generating device is provided for each element of the designation and these generating devices are selectively connected to the trunk outgoing to the manual office. While automatic routine testing equipment has been devised for the greater part of the equipment at the dial office, up to the present, testing the accuracy of such automatically spoken designations as transmitted over the selecting means to the trunk circuit has been by means of a manual listening test performed by the test man. This is a tedious and time consuming task.

According to the present invention means is provided for testing the accuracy of a series of signals transmitted over a channel of unknown efficiency by providing a duplicate series of signals transmitted over a channel of known efficiency and means responsive to differences in the signals as transmitted over the two channels to sound an alarm.

More specifically the invention provides means for testing the accuracy of transmission of artificially generated words over a particular channel by transmitting the same words over a control channel and introducing the words as transmitted over the two channels into a receiving circuit which is sensitive to differences between the words and records such differences.

The specific embodiment of the invention is intended for use in such a testing system as disclosed in Patent 1,624,540, granted April 12, 1927 to E. H. Clark and tests call announcer equipment such as disclosed in Patent 1,840,132, granted January 5, 1932 to T. H. Roberts.

The invention will be more clearly understood from a consideration of the following description in connection with the drawings in which:

Fig. 1 is a diagrammatic showing of the invention;

Fig. 2 is a diagram indicating the arrangement of Figs. 3 to 8, inclusive;

Fig. 3 shows three speech generating devices;

Fig. 4 shows a portion of the equipment used in distributing the sender load to the speech generators;

Figs. 5 and 6 show portions of the sender to be tested; and

Figs. 7 and 8 show portions of the sender testing equipment.

Figure 8:
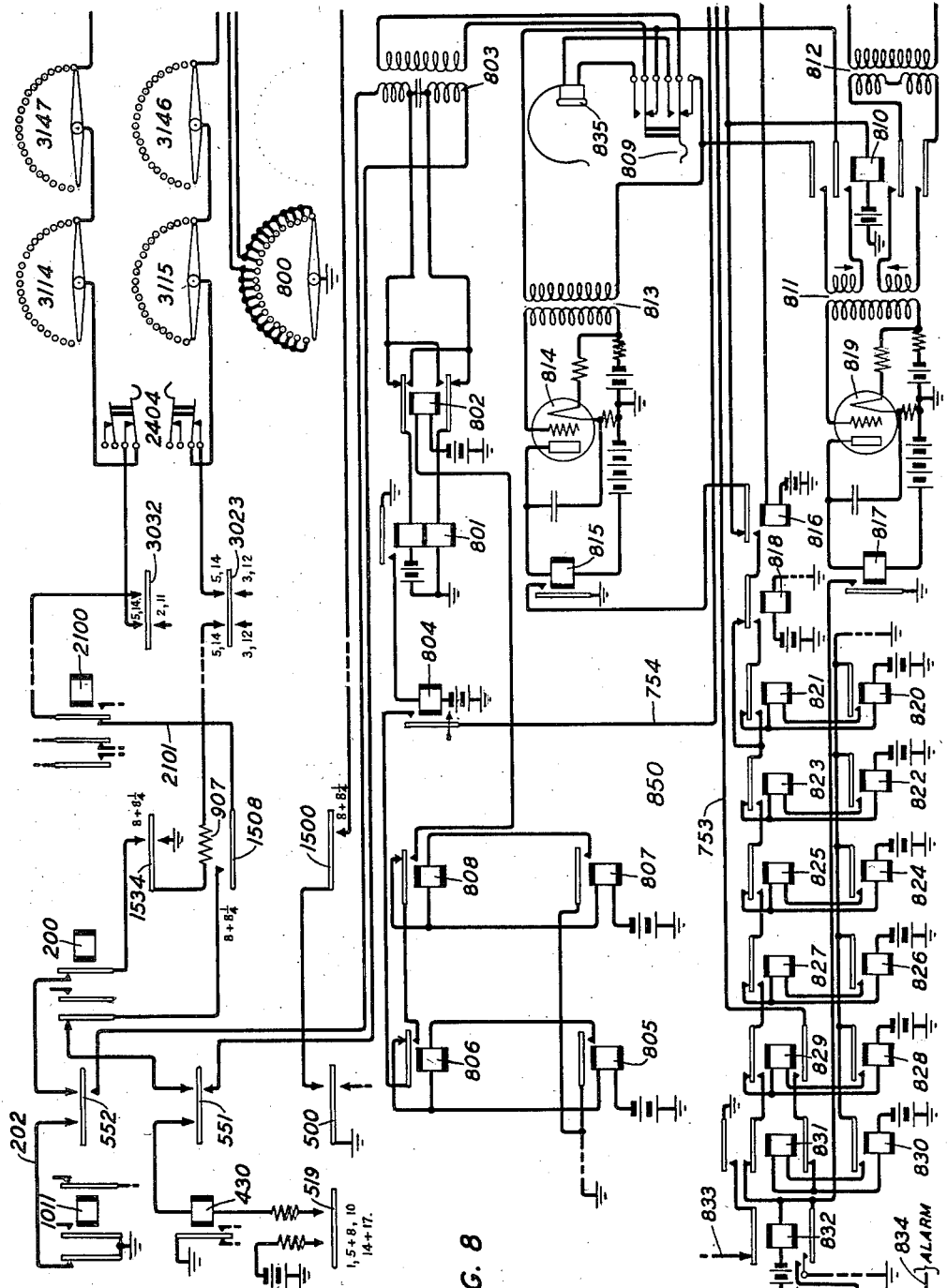

Fig. 1 shows the fundamental scheme embodying the invention. By means of suitable selecting and control apparatus the common speech generator 300 is connected through the repeating coil 2500 of the circuit under test and repeating coil 803 in the test equipment to one primary winding of transformer 811 while the same speech generator is connected through repeating coils 700 and 812 in the test circuit to the other primary winding of transformer 811. It is to be noted that the connection of the circuit under test to its primary winding is reversed so that the current flow in the two primary windings oppose one another. Therefore as long as the same speech current flows through the circuit to be tested and the duplicate or control circuit built up in the test equipment, the current induced in the secondary winding of transformer 811 is so little that even when amplified by amplifier 819, it is insufficient to affect the recorder 850. Repeating coil 813 and amplifier 814 take a small portion of the current received over the circuit under test to indicate to the recorder that the correct number of digits have been received. By the proper adjustment of this auxiliary circuit, inadequate volume of the speech currents may also be indicated. This slight current drain is, of course, compensated for in the duplicate circuit.

Referring now to the more detailed drawings of Figs. 3 to 8, inclusive, a part of the equipment shown in Fig. 8 has been taken from the disclosure of the Clark patent above mentioned and this equipment has been given the numbers used in that patent in order to simplify reference thereto. All numbers in the 800 group in this figure relate to new apparatus. Similarly Figs. 5 and 6 show portions of the circuit and apparatus of the Roberts patent and the original numbering has been retained. For a complete disclosure and description, reference is made to these two patents. Fig. 4 has been skeletonized from the disclosure of Patent 1,841,197 to R. F. Massonneau et al., granted January 12, 1932 which covers switching means for associating the speech generators with the senders and for guarding against the mutilation of calls because of speech failure.

The speech generating machine shown in Fig. 3 comprises fourteen speech generating elements, one for each of the numerical digits and one for each of the four letters used as station designations. Each unit comprises a light source, a lens for focussing the light on a slit (not shown), a photographic record of the pronouncement of the corresponding digit, a photoelectric cell for translating the record into electrical speech currents and one or more amplifiers to raise the volume of the speech currents to the usual conversational level. The photographic record is mounted on the drum for rotation between the light source and the photoelectric cell. The light source and the photoelectric cell. The drums are of such size that the record of the pronouncement is repeated a number of times during each revolution of the drum and the film is opaque between the pronouncements. These dark spaces permit the reenforcement of the drum and are of such length as to simulate the natural interval between spoken words. A cam wheel, carried by the same shaft as the drum, operates an interrupter mechanism which connects ground to a plurality of synchronizing leads during the interval when the speech record is passing between the light source and the photoelectric cell and disconnects ground therefrom during the silent interval.

From a consideration of the Clark patent above referred to, it will be apparent that in the testing of senders, it is customary to arrange the routine of the testing equipment so that it will transmit to the sender to be tested telephone designations indicative of the various types of office to which the switches controlled by the sender have access. The testing unit also includes equipment which simulates the selectors which are controlled by the sender and which indicates whether the sender is functioning correctly.

While no provision is made in the testing equipment of the Clark patent for testing the senders for calls in the call announcer class, it is apparent that such a test may be provided for by the use of additional or intermediate positions on the route switch 1700 and the class switch 500 and that in general it would resemble the test simulating a call to an operator's desk.

In the manner set forth in that patent the test equipment is associated with a sender to be tested by means of a master selector indicated in the present disclosure by brushes 3114 and 3115 and sender selector brushes 3147 and 3146. Brush 800 indicates a brush operating with the master selector brushes and having its terminals strapped to correspond to the grouping of the senders into "loads" for the call announcer machine. For a call announcer test, registration and the control of selections would take place in the manner described in the Clark patent, after which the fundamental circuit for trunk test is established between the test circuit and the sender. When the decoder is released after setting the selection control registers, relay 1142 is operated. Since a call announcer class call is to be handled, class relay 2004 is operated in turn operating relays 2508 and 2151, and when the control sequence switch reaches position 15, causing relay 2503 to operate. The trunk test circuit extends from ground through the lower winding of relay 801, lower back contact of relay 802, lower left winding of repeating coil 803, contacts of cam 551, added to the class sequence switch, outer back contact of relay 200, contact of cam 1508 which is in position 8 during trunk test, back contact of relay 2100, contacts of cam 3032, key 2404, brush 3114, brush 3147, upper back contact of relay 916, contacts of cam 2217, back contact of compensating resistance relay 2024, through compensating resistance 2043, front contact of compensating resistance relay 2023, back contact of relay 2302, contacts of cam 2216, lower left winding of repeating coil 2500, lower back contacts of relays 2501, 2502, 2401 and 2301, upper back contact of relay 2501, back contact of relay 1400, upper winding of polarized relay 2161, winding of polarized relay 2510, upper front contact of relay 2503, upper left winding of repeating coil 2500, front contact of relay 2151, back contact of relay 2152, contacts of cam 2209, front contact of relay 1142, back contact of relay 916, sender selector brush 3146, master selector brush 3115, contact of key 2404, contacts of cam 3023, resistance 901, contacts of cam 1534, inner back contact of relay 200, contacts of cam 552 (added) upper left winding of repeating coil 803, upper back contact of relay 802, upper winding of relay 801 to battery.

As set forth in detail in the Roberts patent above referred to, if the fundamental circuit is properly established, the current flow is in a direction to operate polarized relay 2510 which in turn operates other relays (not shown). In the test circuit relay 801 operates, in turn operating relay 804. Relay 804 connects the synchronizing lead 754 from the speech generator over the back contact of relay 806 to the winding of relay 805 and battery. When the synchronizing lead is closed, relay 805 operates closing a locking circuit through the winding of relay 806 which becomes effective to operate relay 806 when the synchronizing pulse ends. Similarly relays 807 and 808 are operated, relay 808 extending the synchronizing lead to the winding of relay 802. Relay 802 reverses the connection of relay 801 to the fundamental circuit thereby releasing relay 2510 and operating relay 2161.

This fundamental circuit is inductively connected by means of repeating coil 803 through the normal contacts of key 809, to the right winding of repeating coil 813 and to the upper contacts of relay 810, which in turn extend to the upper right winding of repeating coil 811. A circuit is also prepared in any desirable manner between the left windings of repeating coil 700 and the right winding of repeating coil 812, the left winding of this last repeating coil being connected to the lower contacts of relay 810 and thence to the lower right winding of repeating coil 811. Relays 720 to 723, inclusive, serve to connect the right winding of repeating coil 700 with the proper one of the speech generating drums. These relays are operated selectively under the control of the test set registers (not shown) which are, of course, set to the same designation as the registers of the sender. Relays 703, 706, 707, 708, 711, 713 and 714 are operated under the control of the synchronizing means of the speech generating machine and serve to connect the selecting relays 720 to 727 to the registers in the proper order. All of these relays may well operate in a manner similar to the selecting and sequence relays of the Roberts patent above mentioned.

In the sender the operation of relay 2161 in turn operates relay 2501 and relay 2511. Relay 2511 locks, opening the circuit of relay 2501 which releases.

In the test circuit, when the synchronizing lead opens, it releases relay 802 which restores the direction of the current flow over the fundamental circuit. Relay 2161 thereupon releases and relay 2510 reoperates.

When sequence switch 2200 reached position 15, with relay 2503 operated to indicate that a call announcer call was to be handled, a circuit was closed from battery through the winding of relay 2513, lower front contact of relay 2503 to conductor 1004 which extends to the synchronizing cam of the speech generator of Fig. 3. Relay 2513 closes an operating circuit for relay 2514 which is therefore operated at each closure of the synchronizing cam. When relay 2510 reoperates following the operation of relay 2511, relay 2515 operates and with relay 2514 operated relay 2518 operates and locks, in turn operating relay 2519 which connects the right winding of repeating coil 2500 to the contacts of selecting relays 2620 to 2627 which connect the repeating coil to the speech generators. Relay 2519 connects condenser 2523 between the left windings of the repeating coil 2500 around the windings of relays 2161 and 2510 to improve the transmitting quality of the circuit.

As soon as the silent interval ends, the first digit of the wanted number will be pronounced. In the test circuit this voice current will be transmitted through repeating coil 803 and key 809 to repeating coil 813 and amplifier 814, which also rectifies the current and applies it to relay 815 operating it. Relay 815 closes a circuit from ground at its contact over the back contact of relay 816 to the windings of relays 810 and 750 in parallel. Relay 750 operates disconnecting the synchronizing lead from conductor 754 to prevent the reoperation of relay 802 and extends this lead to the winding of relay 751 which in turn controls relay 752. Relay 752 thereupon connects intermittent ground under the control of the call announcer machine to conductor 753. Relay 752 also closes a circuit for relay 711 which starts the operation of the test circuit sequence relays.

Relay 810 in operating simultaneously connects the speech currents from the sender under test and the speech currents from the test circuit to the right windings of coil 811. As indicated on the drawings these right windings are so wound that the flux generated by the speech currents will oppose one another and therefore if they are identical, as will be the case if the same digit is being pronounced over the two circuits, no current will flow through the left winding of coil 811 and relay 817 will not be operated.

Relay 750 in operating also operates relay 816 thereby transferring the circuit controlled by relay 815 to the armature of relay 818. Relay 818 is operated or non-operated under the control of the test circuit registers according as a five digit or four digit number is to be pronounced. Assuming that relay 818 is operated, counting relay 820 is operated over the back contact of relay 821, front contacts of relays 818, 816 and 815 to ground. Relay 820 locks through the winding of relay 821 and, at the end of the first digit, relay 821 operates transferring the circuit controlled by relay 815 to the contact of relay 823. The counting relay pairs 822 and 823, 824 and 825, 826 and 827, 828 and 829 operate under the control of relay 815 as each successive digit is pronounced. When the last digit has been pronounced, relay 829 connects ground from conductor 753 over its front contact and the back contact of relay 831 to the winding of relay 830 which operates and locks through the winding of relay 831 and at the end of the synchronizing pulse, relay 831 also operates. When relay 831 operates it connects ground over its outer upper front contact and the back contact of relay 832 to conductor 833 as an indication that the designation has been pronounced correctly. Conductor 833 would be used to advance the test, probably by advancing sequence switch 1500.

If for any digit no pronouncement is received from the sender or the pronouncement has insufficient volume, relay 815 will not operate, relay 829 will not have been operated when the designation has been completely pronounced and no means will exist for operating it, so that the test will be blocked. If an additional digit is received, or if five digits are pronounced where only four should have been, ground will be connected over the front contacts of relays 815, 816, 818, 821, 823, 825, 827 and 829 and the back contact of relay 831 to the winding of relay 832 and battery thus disconnecting conductor 833 from the contact of relay 831 and blocking the test. In addition if a wrong digit is pronounced, sufficient current will flow in the left winding of coil 811 to cause the operation of relay 817, which in turn operates relay 832 and blocks the test. Relay 832 when operated locks and connects ground to conductor 834 to sound an alarm.

It has been found that the pronouncement of the same digit from different machines differs sufficiently to indicate that a different digit has been received. It is, therefore, necessary that the same machine be used by the testing circuit as is serving the sender under test. In the patent to Massonneau et al., above mentioned, is disclosed an arrangement for connecting the senders with the call announcer machines. According to that patent three machines are provided and the senders are divided into two groups or "loads" so that one machine is free for adjustment and repairs at all times. Keys are provided for setting up the connection between the machine and the load and automatic means for transferring the load, in case any one of the generating drums fail. This equipment is shown in skeleton in Fig. 4, the keys included in box 400 and box 401 indicating both the manual and the automatic means for controlling the connection. Assume, for example, that relays 413 and 421 have been operated. This connects the A load senders, including the sender under test, in multiple to speech generator No. 1, as shown in Fig. 3, while the B load senders indicated by the box B in Fig. 4 are connected in multiple to speech generator No. 2. If speech generator No. 2 should fail, the automatic equipment indicated by box 401 would release relay 421 and operate relay 423 so that both loads would be handled by the same machine. Since the machine No. 3 is not running it can not be selected automatically. However, an alarm operated at the time the changeover occurs calls an attendant, and if machine No. 3 is in working condition, he may start it and transfer one of the loads to that machine. In order to insure that the sender test circuit is served by the same generator as the sender under test, brush 800 is provided, having its terminals strapped in two groups to correspond to the two loads. Ground over brush 800 extends over the strapped contacts corresponding to the A load to the lower armatures of relays 411, 412 and 413 and over the front contact of the operated relay to the winding of the corresponding test circuit connecting relay 431, 432 or 433 and battery. Under the condition first assumed, that is that relays 413 and 421 were operated, as long as the sender is testing in the A load, relay 433 will be operated, connecting the sender test circuit with generator No. 1 and when the test advances to the senders of the B load, relay 433 will release and relay 431 operate to connect the sender test circuit to generator No. 2. If now, as suggested above, generator No. 2 fail, relay 421 is released, and relay 413 is operated, relay 431 is likewise released and relay 433 operated to similarly transfer the test circuit.

It may be noted that the path for the voice currents through the test circuit extends through two repeating coils, namely, coils 700 and 812 in order to make the conditions in the duplicate test circuit correspond as nearly as possible to the path traversed by the speech currents through the sender. Key 809 and receiver 835 permit the test man to make a listening test when desirable.

What is claimed is:

1. In a testing system, means for generating signals, a telephone circuit, means for transmitting a series of said signals to said telephone circuit, and means for testing the accuracy of said signals as transmitted over said telephone circuit comprising means for transmitting duplicate series of signals over said telephone circuit and over means independent of said telephone circuit, and means responsive to differences between said signals to sound an alarm.

2. In a telephone system, means for generating signals, a telephone circuit, means for transmitting a series of said signals to said telephone circuit, and means for testing the accuracy of said signals as transmitted over said telephone circuit comprising means for transmitting duplicate series of signals over said telephone circuit and over means independent of said telephone circuit, a receiving circuit, means for connecting said telephone circuit and said independent means to said receiving circuit, and means in said receiving circuit responsive to differences in said signals to sound an alarm.

3. In a telephone system, means for generating signals, a telephone circuit, means for transmitting a series of said signals to said telephone circuit, and means for testing the accuracy of said signals as transmitted over said telephone circuit comprising means for transmitting duplicate series of signals over said telephone circuit and over means independent of said telephone circuit, a receiving circuit, means for connecting said telephone circuit and said independent means to said receiving circuit, means to count said signals, means normally responsive to the complete operation of said counting means to initiate further tests, and means in said receiving circuit responsive to differences in said signals to disable said initiating means.

4. In a telephone system, means for generating signals, a telephone circuit, means for transmitting a series of said signals to said telephone circuit, and means for testing the accuracy of said signals as transmitted over said telephone circuit comprising means for transmitting a duplicate series of signals over means independent of said telephone circuit, a receiving circuit, means responsive to the transmission of the first of said series of signals to introduce signals from said telephone circuit and from said independent means into said receiving circuit in opposition, and means responsive to differences in said signals to sound an alarm.

5. In a telephone system, speech currents, a telephone circuit, means for transmitting said speech currents to said telephone circuit, and means for testing the accuracy of said speech currents as transmitted over said telephone circuit comprising means for transmitting duplicate speech currents over said telephone circuit and over means independent of said telephone circuit, and means responsive to differences between said speech currents to sound an alarm.

6. In a telephone system, means for generating speech currents characteristic of individual words, means for transmitting said words over a channel of known efficiency, means for transmitting said words over a channel of unknown efficiency, a receiving circuit, means for introducing said words into said receiving circuit over said known and unknown channels in opposition, means for counting the number of said words, means responsive to said counting means to initiate further operation and means in said receiving circuit responsive to differences in said words to disable said initiating means.

7. In a telephone system, a call announcing mechanism, a telephone circuit, means for transmitting telephone designations from said call announcing mechanism to said telephone circuit, and means for testing the accuracy of said designations comprising means for transmitting duplicate designations over said telephone circuit and over means independent of said telephone circuit, and means responsive to differences between said designations to sound an alarm.

8. In a telephone system, means for generating voice currents characteristic of the elements of telephone designations, a telephone circuit, selective means for connecting said generating means to said telephone circuit to transmit a predetermined telephone designation, and means for testing the accuracy of said designation as transmitted, comprising duplicate selecting means having access to said generating means, a receiving circuit, means to introduce voice currents over said telephone circuit and over said duplicate selecting means into said receiving circuit in opposition, said receiving circuit responsive to differences in said voice currents to sound an alarm.

9. In a telephone system, means for generating voice currents characteristic of individual words, a talking circuit, means for transmitting said voice currents to said talking circuit, and means for testing said voice currents as transmitted to said talking circuit comprising a receiving circuit, means for connecting said talking circuit with said receiving circuit, means for transmitting said voice currents from said generating means to said receiving circuit independent of said talking circuit and means under the control of said receiving circuit for indicating whether or not said voice currents coincide.

10. In a telephone system, means for generating voice currents characteristic of individual words, a talking circuit, means for transmitting said voice currents to said talking circuit, and means for testing said voice currents as transmitted to said talking circuit comprising a receiving circuit, means for connecting said talking circuit with said receiving circuit, means for transmitting said voice currents from said generating means to said receiving circuit independent of said talking circuit and means under the control of said receiving circuit for indicating whether or not said voice currents coincide in character, intensity and duration.

11. In a telephone system, means for generating voice currents characteristic of a plurality of individual words, a talking circuit, selective means for transmitting a series of said voice currents to said talking circuit, and means for testing said series of voice currents as transmitted to said talking circuit comprising a receiving circuit, means for connecting said talking circuit with said receiving circuit, means for selectively transmitting the same series of voice currents from said generating means to said receiving circuit independent of said talking circuit and means under the control of said receiving circuit for indicating whether or not said series of voice currents coincide.

12. In a telephone system, means for generating voice currents characteristic of a plurality of individual words, a talking circuit, selective means for transmitting a series of said voice currents to said talking circuit, and means for testing said series of voice currents as transmitted to said talking circuit comprising a receiving circuit, means for connecting said talking circuit with said receiving circuit, means for selectively transmitting the same series of voice currents from said generating means to said receiving circuit independent of said talking circuit and means under the control of said receiving circuit for indicating whether or not said series of voice currents coincide in character, intensity and spacing.

13. In a telephone system, means for generating voice currents characteristic of the elements of telephone designations, a telephone circuit, means to selectively connect said generating means with said telephone circuit to transmit said voice currents thereover, and means to test the voice currents as transmitted over said telephone circuit, comprising a transformer having two primary windings arranged to oppose one another, means for connecting current from said generating means to one primary winding of said transformer over said telephone circuit, means for connecting current from the same generating means to the other primary winding of said transformer independent of said telephone circuit, and means connected with the secondary winding of said transformer responsive to differences in said voice currents to sound an alarm.

14. In a telephone system, senders including control circuits, a plurality of speech current generating means, means in said sender to selectively connect said generating means with said control circuit, routine testing equipment comprising means for selecting a sender for test, means for controlling the operation of said sender to connect said speech generating means to said control circuit, means to predetermine which speech generating means should be selected and means to test whether said predetermined speech generating means have been selected.

15. In a telephone system, senders including control circuits, a plurality of speech current generating means, means in said sender to selectively connect said generating means with said control circuit, routine testing equipment comprising means for selecting a sender for test, means for controlling the operation of said sender to connect said speech generating means to said control circuit, means to predetermine which speech generating means should be selected and means to test whether said predetermined speech generating means have been selected, said means comprising a transformer having two primary windings arranged to oppose one another, means for connecting the control circuit of the sender under test to one primary winding of the transformer, means independent of said sender for connecting said predetermined generating means to the other primary winding of said transformer and means connected with the secondary winding of said transformer responsive to differences in speech currents transmitted to the two primary windings of said transformer to sound an alarm.

FRANK K. LOW.